United States Patent
Aketagawa et al.

(10) Patent No.: US 12,486,484 B2
(45) Date of Patent: Dec. 2, 2025

(54) ANAEROBIC DIGESTION PROCESS MONITORING SYSTEM AND ANAEROBIC DIGESTION PROCESS MONITORING METHOD

(71) Applicant: Mitsubishi Electric Corporation, Tokyo (JP)

(72) Inventors: Kyohei Aketagawa, Tokyo (JP); Noriaki Katsumata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/118,364

(22) PCT Filed: Oct. 11, 2022

(86) PCT No.: PCT/JP2022/037772
§ 371 (c)(1),
(2) Date: Apr. 4, 2025

(87) PCT Pub. No.: WO2024/079773
PCT Pub. Date: Apr. 18, 2024

(65) Prior Publication Data
US 2025/0257308 A1    Aug. 14, 2025

(51) Int. Cl.
*C12M 3/00* (2006.01)
*C12M 1/00* (2006.01)
(Continued)

(52) U.S. Cl.
CPC ............ *C12M 41/26* (2013.01); *C12M 21/04* (2013.01); *C12M 41/28* (2013.01); *C12M 41/44* (2013.01); *C12M 41/48* (2013.01)

(58) Field of Classification Search
CPC ............................. C12M 41/48; C12M 21/04
See application file for complete search history.

(56) References Cited

U.S. PATENT DOCUMENTS

| | | | |
|---|---|---|---|
| 2012/0064506 A1* | 3/2012 | Stover | C12M 29/18 435/287.5 |
| 2020/0074307 A1* | 3/2020 | Kent | G06N 20/00 |

(Continued)

FOREIGN PATENT DOCUMENTS

| | | | |
|---|---|---|---|
| DE | 102011110638 A1 | * | 2/2013 |
| FR | 3047582 A1 | * | 8/2017 |

(Continued)

OTHER PUBLICATIONS

International Search Report and Written Opinion mailed on Dec. 20, 2022, received for International Application No. PCT/JP2022/037772, filed on Oct. 11, 2022, 16 pages including English Translation.

(Continued)

*Primary Examiner* — Nathan A Bowers
(74) *Attorney, Agent, or Firm* — XSENSUS LLP (57) ABSTRACT

Provided is an anaerobic digestion process monitoring system for predicting a biogas production amount with high accuracy even when the activity of anaerobic microorganisms in a digestion tank changes. The anaerobic digestion process monitoring system includes: a first sensor which measures a feeding amount of organic waste into a digestion tank and outputs a measurement result as load data; a second sensor which measures a property of a fermented liquid inside the digestion tank and outputs a measurement result as fermented liquid property data; a preprocessing unit which calculates estimate activity index data indicating an anaerobic microorganism activity level from load data and fermented liquid property data, using a first estimation model; and a gas production amount prediction unit which calculates a biogas production amount prediction value from load data, fermented liquid property data, and estimate activity index data, using a second estimation model.

10 Claims, 5 Drawing Sheets

(51) Int. Cl.
     *C12M 1/107*     (2006.01)
     *C12M 1/34*     (2006.01)
     *C12M 1/36*     (2006.01)

(56) References Cited

U.S. PATENT DOCUMENTS

| | | | |
|---|---|---|---|
| 2021/0287119 A1* | 9/2021 | Rink | G06Q 30/0201 |
| 2022/0228174 A1* | 7/2022 | Rodriguez | C12M 41/46 |

FOREIGN PATENT DOCUMENTS

| | | |
|---|---|---|
| JP | S58-216799 A | 12/1983 |
| JP | 2005-111338 A | 4/2005 |
| JP | 2005-152851 A | 6/2005 |
| JP | 2008-178827 A | 8/2008 |
| JP | 2009-160497 A | 7/2009 |
| JP | 2013-204031 A | 10/2013 |
| JP | 2019-141778 A | 8/2019 |

OTHER PUBLICATIONS

Notice of Reasons for Refusal mailed on Apr. 4, 2023, received for JP Application 2023-511819, 18 pages including English Translation.
Decision of Refusal mailed on Oct. 3, 2023, received for JP Application 2023-511819, 9 pages including English Translation.
Notice of Reasons for Refusal mailed on Feb. 6, 2024, received for JP Application 2023-511819, 5 pages including English Translation.
Decision to Grant mailed on Mar. 5, 2024, received for JP Application 2023-511819, 5 pages including English Translation.

* cited by examiner

ANAEROBIC DIGESTION PROCESS MONITORING SYSTEM AND ANAEROBIC DIGESTION PROCESS MONITORING METHOD

CROSS-REFERENCE TO RELATED APPLICATION

This application is a national stage application, pursuant to 35 U.S.C. § 371, of International Patent Application No. PCT/JP2022/037772, filed Oct. 11, 2022, the entire contents of which are incorporated herein by reference.

TECHNICAL FIELD

The present disclosure relates to an anaerobic digestion process monitoring system and an anaerobic digestion process monitoring method.

BACKGROUND ART

In order to recycle organic waste such as sludge, food residue, and industrial waste water as resources, the organic waste is fed into a digestion tank having acclimated anaerobic microorganisms to undergo methane fermentation, so as to be taken out as biogas. This process is called an anaerobic digestion process, and using the biogas taken out from the organic waste, conversion to thermal energy through a boiler or conversion to electric energy through an electric generator is performed. Thus, it is possible to contribute to recycling of organic waste or reduction of greenhouse gas through reduction of the fuel usage amount or the electricity usage amount.

In the energy industry, for the purpose of reduction in greenhouse gas, measures against power outage in large-scale disasters (resilience strengthening), and the like, innovation from a conventional energy system that supplies power by generating electricity in a centralized manner in a large-scale power plant, to an energy system in which a geographically distributed power supply network utilizing renewable energy is constructed, is considered important, and this is called 3D (decarbonization, decentralization, digitalization) in the energy industry. By constructing a microgrid using a distributed power supply (decentralization) utilizing renewable energy (decarbonization), it becomes possible to reduce greenhouse gas or establish power outage measures (resilience strengthening) in large-scale disasters. Meanwhile, in constructing the microgrid, it is important to adjust the balance between demand and supply of power, reduce imbalance, and avoid output reduction in renewable energy electric generation. Therefore, it is necessary to model (digitalize) an electric generation capacity and allow prediction thereof so that a business operator such as an aggregator can grasp a power adjustment capacity of a distributed power supply.

In biogas electric generation using biogas obtained through the anaerobic digestion process, not only power can be extracted from organic waste which is produced semi-permanently through human activities, but also an electric generation capacity is not influenced by natural environments unlike solar power generation or wind power generation. Therefore, the biogas electric generation has a potential to serve as a distributed power supply using renewable energy which is prospective for achieving 3D in energy industry.

On the other hand, there are two problems in the biogas electric generation. The first problem is digitalization. The biogas production amount changes depending on (1) the amount and the property of organic substances fed into a digestion tank, (2) the mixture ratio of the fed organic substances, and (3) the activity of anaerobic microorganisms in the digestion tank, and the kinds of organic wastes to be fed into the digestion tank are increasing. Therefore, a process in which the organic waste is transformed to biogas is extremely complicated, and modeling (digitalization) of a practical anaerobic digestion process has not been achieved yet. The second problem is increase in the operation management load. When biogas electric generation facilities are provided in a distributed manner at various locations, the number of devices extremely increases, so that the load of operation management significantly increases. Nevertheless, population decrease or shortage of skilled and experienced workers are becoming serious, and increase in the operation management load can be a significant obstacle in socially implementing biogas electric generation as a distributed power supply. Therefore, in order to use biogas electric generation by biogas obtained through the anaerobic digestion process as a distributed power supply, it is necessary to construct a practical model of the anaerobic digestion process and accurately predict a biogas electric generation amount and further a biogas production amount, and an automated operation monitoring system and an automated operation monitoring method for the anaerobic digestion process that enable reduction in the operation management load are needed.

As an anaerobic digestion process monitoring system, a system for comparing an actual measurement value of a biogas production speed and a prediction value of the biogas production speed of biogas produced from a digestion tank is proposed, and as a method for predicting a biogas production amount, a system in which a biogas production speed or a decomposition speed is calculated in advance for each kind of organic wastes to be fed, and the biogas production amount is predicted in accordance with the feeding amount or the mixture ratio of actual organic wastes, is proposed (see, for example, Patent Document 1).

CITATION LIST

Patent Document

Patent Document 1: Japanese Laid-Open Patent Publication No. 2005-111338

SUMMARY OF THE INVENTION

Problem to be Solved by the Invention

In the anaerobic digestion process monitoring system shown in Patent Document 1, the biogas production speed for each kind of organic wastes to be fed is calculated in advance, and the biogas production amount is predicted in accordance with the feeding amount of each actual organic waste. The activity of anaerobic microorganisms is accelerated or inhibited in accordance with a combination of organic wastes or the feeding amount thereof. Therefore, the activity of anaerobic microorganisms in the digestion tank can change. As a result of change in the activity of anaerobic microorganisms in the digestion tank, the biogas production speed changes, so that prediction accuracy for the biogas production amount is reduced.

The present disclosure has been made to solve the above problem, and an object of the present disclosure is to provide an anaerobic digestion process monitoring system and an anaerobic digestion process monitoring method for predicting a biogas production amount with high accuracy even when the activity of anaerobic microorganisms in a digestion tank changes.

Means to Solve the Problem

An anaerobic digestion process monitoring system according to the present disclosure is an anaerobic digestion process monitoring system which predicts a production amount of biogas to be produced from a fermented liquid obtained by acclimating anaerobic microorganisms inside a digestion tank with organic waste fed into the digestion tank, and monitors a state of an anaerobic digestion process, the anaerobic digestion process monitoring system including: a first sensor which measures a feeding amount of the organic waste into the digestion tank and outputs a measurement result as load data; a second sensor which measures a property of the fermented liquid inside the digestion tank and outputs a measurement result as fermented liquid property data; a process observation unit which accumulates the load data and the fermented liquid property data; a preprocessing unit which calculates estimate activity index data indicating an activity level of the anaerobic microorganisms from the load data and the fermented liquid property data, using a first estimation model; and a gas production amount prediction unit which calculates a biogas production amount prediction value from the load data, the fermented liquid property data, and the estimate activity index data, using a second estimation model.

Effect of the Invention

The anaerobic digestion process monitoring system according to the present disclosure includes: the first sensor which measures the feeding amount of the organic waste into the digestion tank and outputs a measurement result as the load data; the second sensor which measures the property of the fermented liquid inside the digestion tank and outputs a measurement result as the fermented liquid property data; the process observation unit which accumulates the load data and the fermented liquid property data; the preprocessing unit which calculates the estimate activity index data indicating the activity level of the anaerobic microorganisms from the load data and the fermented liquid property data, using the first estimation model; and the gas production amount prediction unit which calculates the biogas production amount prediction value from the load data, the fermented liquid property data, and the estimate activity index data, using the second estimation model. Thus, it is possible to predict the biogas production amount with high accuracy even when the activity of anaerobic microorganisms in the digestion tank changes.

DESCRIPTION OF EMBODIMENTS

Hereinafter, an anaerobic digestion process monitoring system and an anaerobic digestion process monitoring method according to embodiments for implementing the present disclosure will be described in detail, with reference to the drawings. In the drawings, the same reference characters denote the same or corresponding parts.

Embodiment 1

Figure 1:
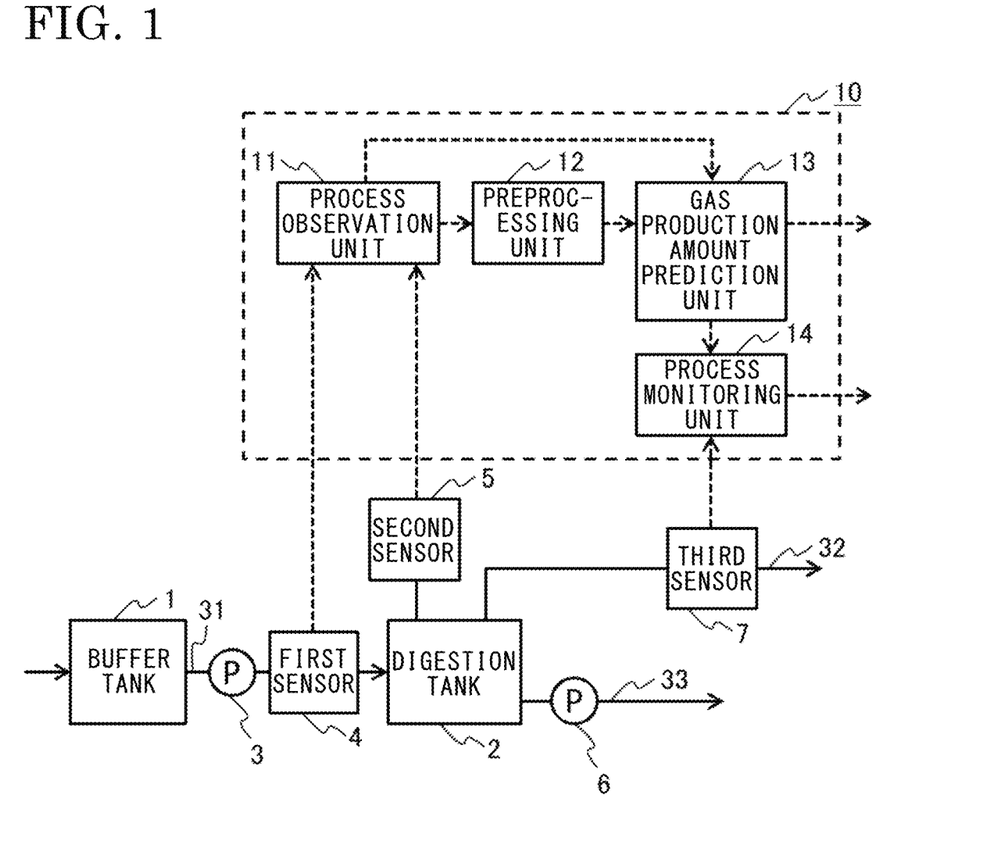
FIG. 1 shows a configuration of an anaerobic digestion process monitoring system according to embodiment 1.

FIG. 1 shows a configuration of an anaerobic digestion process monitoring system according to embodiment 1. In FIG. 1, solid-line arrows represent pipes, and dotted-line arrows represent transfer of information through, for example, signal lines. The anaerobic digestion process monitoring system includes a monitoring device 10, a first sensor 4, a second sensor 5, and a third sensor 7. The monitoring device 10 includes a process observation unit 11, a preprocessing unit 12, a gas production amount prediction unit 13, and a process monitoring unit 14. Organic waste such as sludge, food residue, and industrial waste water is crushed by a disposer or the like as necessary, and then is sent to a buffer tank 1. The buffer tank 1 is for storing the organic waste to be fed into a digestion tank 2, and the buffer tank 1 and the digestion tank 2 are connected via a feeding pipe 31. The organic waste inside the buffer tank 1 is fed into the digestion tank 2 via feeding means 3. The feeding means 3 is, for example, a pump. The organic waste fed into the digestion tank 2 is assimilated by anaerobic microorganisms acclimated inside the digestion tank 2, whereby biogas is produced. The first sensor 4 for measuring the feeding amount of the organic waste into the digestion tank 2 is provided at the feeding pipe 31, and the first sensor 4 outputs a measurement result, i.e., information about the feeding amount of the organic waste, as load data, to the process observation unit 11 of the monitoring device 10. The process observation unit 11 accumulates the acquired load data.

The biogas produced in the digestion tank 2 is sent through a gas pipe 32 to, for example, a biogas electric generator. The third sensor 7 for measuring the production amount of biogas produced in the digestion tank 2 is provided at the gas pipe 32, and the third sensor 7 outputs a measurement result, i.e., information about a biogas production amount actual measurement value, to the process monitoring unit 14 of the monitoring device 10.

The second sensor 5 provided for the digestion tank 2 measures the property of a fermented liquid which is a suspension of the organic waste and the anaerobic microorganisms inside the digestion tank 2, and outputs a measurement result, i.e., information about the property of the fermented liquid, as fermented liquid property data, to the process observation unit 11 of the monitoring device 10. The process observation unit 11 accumulates the acquired fermented liquid property data. The property of the fermented liquid measured by the second sensor 5 has a correlation with estimate activity index data which is a property value serving as an index for the activity of the anaerobic microorganisms. That is, the property of the fermented liquid measured by the second sensor 5 is required to be, for example, a property value that can be automatically measured and is indicated by an intermediate product (organic acid, hydrogen, carbon dioxide, etc.) in a process in which the organic waste is transformed to biogas by the anaerobic microorganisms, and may be a pH, TDS (Total Dissolved Solids), or a carbonic acid gas ion concentration, for example. Alternatively, the property of the fermented liquid measured at the second sensor 5 is required to be, for example, a property value that can be automatically measured and is indicated by a substance (ammonia nitrogen, organic acid, nutrient salt, etc.) related to inhibition of the activity of the anaerobic microorganisms, and may be pH, TDS, or an electrical conductivity, for example. That is, the property of the fermented liquid measured by the second sensor 5 includes at least one of pH, TDS, a carbonic acid gas ion concentration, and an electrical conductivity, for example.

As the organic waste is fed into the digestion tank 2, the discharge means 6 discharges the residue of anaerobic microorganisms that have become no longer necessary and the organic waste that has not transformed to biogas, as a fermentation residue, through a discharge pipe 33 to the outside of the digestion tank 2. The discharge means 6 is a pump, for example.

Transfer of information from the first sensor 4 to the process observation unit 11, transfer of information from the second sensor 5 to the process observation unit 11, and transfer of information from the third sensor 7 to the process monitoring unit 14, may be performed through communication via a wire or wirelessly, or may be performed via a network such as the Internet.

Next, operation of the monitoring device 10 will be described. The process observation unit 11 acquires the load data from the first sensor 4, acquires the fermented liquid property data from the second sensor 5, accumulates the acquired load data and fermented liquid property data, and outputs the load data and the fermented liquid property data to the preprocessing unit 12 and the gas production amount prediction unit 13. The preprocessing unit 12 acquires the load data and the fermented liquid property data from the process observation unit 11, calculates estimate activity index data indicating the activity level of the anaerobic microorganisms from the load data and the fermented liquid property data, using a first estimation model, accumulates the calculated estimate activity index data, and outputs the estimate activity index data to the gas production amount prediction unit 13.

The gas production amount prediction unit 13 acquires the load data and the fermented liquid property data from the process observation unit 11, acquires the estimate activity index data from the preprocessing unit 12, and calculates a biogas production amount prediction value from the load data, the fermented liquid property data, and the estimate activity index data, using a second estimation model. The calculated biogas production amount prediction value is outputted to the process monitoring unit 14 and is also outputted to the outside of the monitoring device 10. For example, in a case where the gas pipe 32 is connected to biogas electric generation equipment, the biogas production amount prediction value outputted from the gas production amount prediction unit 13 is used for prediction of the biogas electric generation amount in the biogas electric generation equipment.

The process monitoring unit 14 acquires the biogas production amount actual measurement value from the third sensor 7, acquires the biogas production amount prediction value from the gas production amount prediction unit 13, calculates an error ratio from the biogas production amount actual measurement value and the biogas production amount prediction value, and monitors whether or not the error ratio is a value within a predetermined range. The process monitoring unit 14 may output the error ratio to the outside of the monitoring device 10, or may output a result obtained by determining whether or not the error ratio is a value within a predetermined range, to the outside of the monitoring device 10. For example, the error ratio can be calculated as follows: (biogas production amount prediction value−biogas production amount actual measurement value)/biogas production amount actual measurement value*100.

Here, the first estimation model and the second estimation model will be described. The first estimation model is, for example, a calculation formula for calculating the estimate activity index data indicating the activity level of the anaerobic microorganisms from the load data and the fermented liquid property data, and is a regression formula in which the estimate activity index data such as the concentration of an intermediate product (organic acid, hydrogen, carbon dioxide, etc.) or the concentration of a substance (ammonia nitrogen, organic acid, nutrient salt, etc.) related to inhibition of the activity of the anaerobic microorganisms is set as an objective variable, and for each estimate activity index data, the load data and the fermented liquid property data are set as a plurality of explanatory variables. The second estimation model is, for example, a calculation formula for calculating the biogas production amount prediction value from the load data, the fermented liquid property data, and the estimate activity index data, and is a regression formula in which the biogas production amount is set as an objective variable, and the load data, the fermented liquid property data, and the estimate activity index data are set as a plurality of explanatory variables. After system introduction, a learning period is provided and the preprocessing unit 12 performs multivariate analysis, thereby, for each estimate activity index data, extracting necessary explanatory variables from the measured load data and the measured fermented liquid property data and acquiring coefficients for the necessary explanatory variables, to construct a regression formula of the first estimation model. After construction of the first estimation model, the gas production amount prediction unit 13 performs multivariate analysis, thereby, for the biogas production amount actual measurement value, extracting necessary explanatory variables from the measured load data, the measured fermented liquid property data, and the estimate activity index data obtained by the first estimation model, and acquiring coefficients for the necessary explanatory variables, to construct a regression formula of the second estimation model. Before system introduction, the calculation formula of the first estimation model and the calculation formula of the second estimation model may be calculated through a test in advance. This method will be described below.

In a test in which organic waste is fed into a laboratory-test digestion tank, the feeding amount of the organic waste fed into the digestion tank is measured as load data, and TVS (Total Volatile Solids) which is an index for the organic substance amount of the fed organic waste is measured. If there are a plurality of kinds of organic wastes, the feeding amount and TVS of organic waste are measured for each kind of organic wastes. The laboratory-test digestion tank into which the organic waste has been fed is kept at a constant temperature, and the biogas production amount is measured after elapse of 20 days, for example. Thus, data of the biogas production amount per fed TVS with respect to the load data which is the feeding amount of the fed organic waste can be acquired. At this time, under various conditions of the feeding amount (load data) of organic waste into the digestion tank, values such as pH, TDS, a carbonic acid gas ion concentration, and an electrical conductivity of the fermented liquid inside the digestion tank are measured as fermented liquid property data. Further, the concentrations of ammonia nitrogen, an organic acid (acetic acid, valeric acid, butyric acid, propionic acid, etc.), a nutrient salt (nickel, iron, cobalt, etc.), and the like are measured as estimate activity index data which are property values serving as indices for the activity of the anaerobic microorganisms.

When the feeding amount (load data) of the organic waste into the digestion tank is changed, the concentration of the organic acid (acetic acid, valeric acid, butyric acid, propionic acid, etc.) increases or the amount of nutrient salt becomes insufficient, so that pH of the fermented liquid in the digestion tank is reduced and the activity of the anaerobic microorganisms is reduced. Therefore, by the second sensor 5, pH, TDS, the carbonic acid gas ion concentration, and the like of the fermented liquid in the digestion tank 2 are measured as the property of the fermented liquid, and the values of pH, TDS, the carbonic acid gas ion concentration, and the like are used as fermented liquid property data, whereby it is possible to estimate an organic acid concentration or a nutrient salt concentration which is estimate activity index data serving as an index for the activity of the anaerobic microorganisms, from the value of pH, TDS, the carbonic acid gas ion concentration, or the like which is the fermented liquid property data. For example, while the feeding amount of the organic waste into the laboratory-test digestion tank is gradually increased and the load amount is measured, pH, TDS, or the carbonic acid gas ion concentration which is fermented liquid property data of the fermented liquid, and the organic acid concentration, are measured, whereby information about the correlation between the organic acid concentration and pH, TDS, or the carbonic acid gas ion concentration which is fermented liquid property data of the fermented liquid, can be obtained. On the basis of the information, it is possible to obtain the first estimation model for calculating the organic acid concentration or the nutrient salt concentration which is estimate activity index data indicating the activity level of the anaerobic microorganisms from the load data and pH, TDS, or the carbonic acid gas ion concentration which is the fermented liquid property data.

When the feeding amount (load data) of the organic waste into the digestion tank is changed, the ammonia nitrogen concentration increases and the activity of the anaerobic microorganisms is reduced. Therefore, by the second sensor 5, the electrical conductivity of the fermented liquid in the digestion tank 2 is measured as the property of the fermented liquid, and the value of the electrical conductivity is used as fermented liquid property data, whereby it is possible to estimate the ammonia nitrogen concentration which is estimate activity index data serving as an index for the activity of the anaerobic microorganisms, from the value of the electrical conductivity which is the fermented liquid property data. For example, while the feeding amount of the organic waste into the laboratory-test digestion tank is gradually increased and the load amount is measured, the electrical conductivity and the ammonia nitrogen concentration of the fermented liquid are measured, whereby information about the correlation between the electrical conductivity and the ammonia nitrogen concentration of the fermented liquid can be obtained. On the basis of the information, it is possible to obtain the first estimation model for calculating the ammonia nitrogen concentration which is estimate activity index data indicating the activity level of the anaerobic microorganisms from the load data and the electrical conductivity which is the fermented liquid property data.

By performing multivariate analysis with the biogas production amount per fed TVS, the load amount which is the feeding amount of the organic waste, pH, TDS, or the carbonic acid gas ion concentration of the fermented liquid, and the organic acid concentration or the nutrient salt concentration calculated from pH, TDS, or the carbonic acid gas ion concentration, it is possible to obtain information about the correlation between: the biogas production amount prediction value; and the load data, pH, TDS, or the carbonic acid gas ion concentration, and the organic acid concentration or the nutrient salt concentration, whereby it is possible to obtain the second estimation model for calculating the biogas production amount prediction value from the load amount and pH, TDS, or the carbonic acid gas ion concentration of the fermented liquid. Alternatively, by performing multivariate analysis with the biogas production amount per fed TVS, the load amount which is the feeding amount of the organic waste, the electrical conductivity of the fermented liquid, and the ammonia nitrogen concentration calculated from the electrical conductivity, it is possible to obtain information about the correlation between the biogas production amount prediction value, and the load data, the electrical conductivity, and the ammonia nitrogen concentration, whereby it is possible to obtain the second estimation model for calculating the biogas production amount prediction value from the load amount and the electrical conductivity of the fermented liquid. Still alternatively, by performing multivariate analysis with the biogas production amount per fed TVS, the load amount which is the feeding amount of the organic waste, pH, TDS, or the carbonic acid gas ion concentration of the fermented liquid, the organic acid concentration calculated from pH, TDS, or the carbonic acid gas ion concentration, the electrical conductivity of the fermented liquid, and the ammonia nitrogen concentration calculated from the electrical conductivity, it is possible to obtain information about the correlation between: the biogas production amount prediction value; and the load data, pH, TDS or the carbonic acid gas ion concentration, the electrical conductivity, the organic acid concentration, and the ammonia nitrogen concentration, whereby it is possible to obtain the second estimation model for calculating the biogas production amount prediction value from the load amount, pH, TDS, or the carbonic acid gas ion concentration of the fermented liquid, and the electrical conductivity of the fermented liquid.

As described above, with the first estimation model, it is possible to calculate the estimate activity index data serving as an index for the activity of the anaerobic microorganisms of the fermented liquid, from the load amount which is the feeding amount of the organic waste and the fermented liquid property data which is information about the property of the fermented liquid in the digestion tank, on the basis of information about the correlation acquired in a given learning period after system introduction or through a laboratory test before system introduction. In a case where the fermented liquid property data is pH, TDS, or the carbonic acid gas ion concentration of the fermented liquid, the estimate activity index data is the organic acid concentration or the nutrient salt concentration of the fermented liquid. In a case where the fermented liquid property data is the electrical conductivity of the fermented liquid, the estimate activity index data is the ammonia nitrogen concentration of the fermented liquid. With the second estimation model, it is possible to calculate the biogas production amount prediction value per fed TVS, from the load amount which is the feeding amount of the organic waste, the fermented liquid property data which is information about the property of the fermented liquid in the digestion tank, and the estimate activity index data calculated with the first estimation model, on the basis of information about the correlation acquired in a given learning period after system introduction or through a laboratory test before system introduction.

A property value that cannot be automatically measured by a sensor or the like and serves as an index for the activity of the anaerobic microorganisms which is needed for accurately predicting the biogas production amount, is estimated as estimate activity index data by the first estimation model, and the estimate activity index data, the load data, and the fermented liquid property data are inputted to the calculation formula of the second estimation model, whereby the biogas production amount prediction value can be obtained. Thus, it is possible to predict the production amount of biogas with high accuracy while suppressing increase in the operation load. The fermented liquid property data is not limited to pH, TDS, the carbonic acid gas ion concentration, or the electrical conductivity. The fermented liquid property data may be an acetic acid ion concentration, a COD (Chemical Oxygen Demand) concentration, or the like, and may be any value of which a correlation with the property value representing the activity of the anaerobic microorganisms, such as the organic acid concentration, the nutrient salt concentration, or the ammonia nitrogen concentration of the fermented liquid, can be confirmed in the test in which the organic waste is fed into the laboratory-test digestion tank. As the number of kinds of fermented liquid property data is increased, estimation accuracy of the estimate activity index data can be enhanced. However, if the number of kinds of fermented liquid property data is increased, the number of necessary sensors increases, so that the initial cost and the load of operation management increase. Therefore, the number of kinds of fermented liquid property data may be determined in accordance with necessary estimation accuracy.

The process monitoring unit 14 may acquire the biogas production amount prediction value from the gas production amount prediction unit 13, and acquire the biogas production amount actual measurement value from the third sensor 7. Then, in a case where the value of the error ratio between the biogas production amount actual measurement value and the biogas production amount prediction value is outside a predetermined error ratio normal range, and the biogas production amount actual measurement value is within a predetermined gas production amount normal range, the process monitoring unit 14 may determine that there is a possibility that the estimate activity index data calculated by the first estimation model has deviated from a normal value range because at least one of the first sensor 4 and the second sensor 5 has failed, and may output a signal for recommending maintenance of the first sensor 4 and the second sensor 5. With the above process, it is possible to smoothly address maintenance for the first sensor 4 and the second sensor 5.

The gas production amount prediction unit 13 may output the estimate activity index data together with the biogas production amount prediction value, to the process monitoring unit 14. At this time, in a case where the value of the error ratio between the biogas production amount actual measurement value acquired from the third sensor 7 and the biogas production amount prediction value acquired from the gas production amount prediction unit 13 is outside a predetermined error ratio normal range, the biogas production amount actual measurement value is outside a predetermined gas production amount normal range, and the estimate activity index data acquired from the gas production amount prediction unit 13 is within a predetermined activity index normal range, the process monitoring unit 14 may determine that there is a possibility that the third sensor 7 has failed, and may output a signal for recommending maintenance of the third sensor 7. With the above process, it is possible to smoothly address maintenance for the third sensor 7. In a case where the value of the error ratio between the biogas production amount actual measurement value acquired from the third sensor 7 and the biogas production amount prediction value acquired from the gas production amount prediction unit 13 is within a predetermined error ratio normal range, the biogas production amount actual measurement value is outside a predetermined gas production amount normal range, and the estimate activity index data is outside a predetermined activity index normal range, the process monitoring unit 14 may determine that the activity of the anaerobic microorganisms is reduced by the influence of the organic waste, and may output a signal for recommending stop of a biogas production system and recommending confirmation of the property of the organic waste which is present inside the buffer tank 1 and to be fed into the digestion tank 2. With the above process, it is possible to smoothly address stop of the biogas production system and confirmation of the property of the organic waste inside the buffer tank 1. The process monitoring unit 14 may acquire the estimate activity index data from the preprocessing unit 12.

When using biogas electric generation by biogas obtained through the anaerobic digestion process as a distributed power supply, a business operator such as an aggregator may set the error ratio normal range as appropriate in accordance with an allowable change ratio of the power adjustment capacity required in accordance with the power amount in biogas electric generation and the total power amount in the microgrid including the biogas electric generation. The error ratio normal range is preferably not greater than 10% and more preferably not greater than 5%. In a case where the property of the organic waste changes by seasons, it is necessary to change rated values in consideration of change by seasons. Therefore, in a case where the property of the organic waste changes by seasons, it is preferable that the test in which the organic waste is fed into the laboratory-test digestion tank with the feeding amount of the organic waste as a parameter is performed in each season of spring, summer, autumn, and winter. The activity index normal range may be set as appropriate on the basis of data acquired in the test in which the organic waste is fed into the laboratory-test digestion tank with the feeding amount of the organic waste as a parameter. For example, the organic acid concentration is preferably not greater than 2000 mg/L and more preferably not greater than 100 mg/L. For example, the ammonia nitrogen concentration is preferably not greater than 5000 mg/L and more preferably not greater than 1000 mg/L.

From the standpoint of improvement in prediction accuracy for the biogas production amount, it is preferable that the first sensor 4 measures the feeding amount of the organic waste in real time at predetermined measurement time intervals and outputs a measurement result as the load data to the process observation unit 11, and the process observation unit 11 accumulates the load data as time-series data at measurement time intervals. It is preferable that the second sensor 5 measures the property of the fermented liquid inside the digestion tank 2 in real time at the same measurement time intervals as the first sensor 4, and outputs a measurement result as the fermented liquid property data to the process observation unit 11, and the process observation unit 11 accumulates the fermented liquid property data as time-series data at the same measurement time intervals as the first sensor 4. It is preferable that the third sensor 7 measures the production amount of biogas produced in the digestion tank 2, in real time at the same measurement time intervals as the first sensor 4, and outputs the measurement value as the biogas production amount prediction value to the process monitoring unit 14. The measurement time intervals of measurement by the first sensor 4, the second sensor 5, and the third sensor 7 are not particularly limited. However, if the measurement time intervals are long, prediction accuracy for the biogas production amount might be reduced, and if the measurement time intervals are short, the amount of data to be accumulated in the process observation unit 11 or the process monitoring unit 14 increases. Therefore, the measurement time intervals are preferably not shorter than 1 minute and not longer than 60 minutes, and more preferably not shorter than 5 minutes and not longer than 10 minutes.

It is preferable that a measurement time (measurement timing) for each time-series load data when the first sensor 4 measures the feeding amount of organic waste, a measurement time (measurement timing) for each time-series fermented liquid property data when the second sensor 5 measures the property of the fermented liquid inside the digestion tank 2, and a measurement time (measurement timing) for each time-series biogas production amount actual measurement value when the third sensor 7 measures the actual measurement value of the biogas production amount, are set to be the same. That is, it is preferable that the second sensor 5 measures the property of the fermented liquid at the time when the first sensor 4 measures the feeding amount of the organic waste, and the third sensor 7 measures the actual measurement value of the production amount of biogas at the time when the first sensor 4 measures the feeding amount of the organic waste. Further, it is preferable that, where one of times when the first sensor 4 measures the feeding amount of the organic waste is defined as a specific time, the preprocessing unit 12 calculates the estimate activity index data at the specific time, from the load data measured at the specific time and the fermented liquid property data measured at the specific time, using the first estimation model, and accumulates the estimate activity index data at each time as time-series data at measurement time intervals. Similarly, also in a case where the gas production amount prediction unit 13 calculates the biogas production amount prediction value using the second estimation model with the load data, the fermented liquid property data, and the estimate activity index data used as inputs, it is preferable that the biogas production amount prediction value is calculated from the load data measured at the specific time and the fermented liquid property data measured at the specific time, and the estimate activity index data at the same specific time. With the above process, high-accuracy prediction for the biogas production amount in accordance with change in the activity of the anaerobic microorganisms which can change from moment to moment can be performed while increase in the operation load is suppressed.

Figure 2:
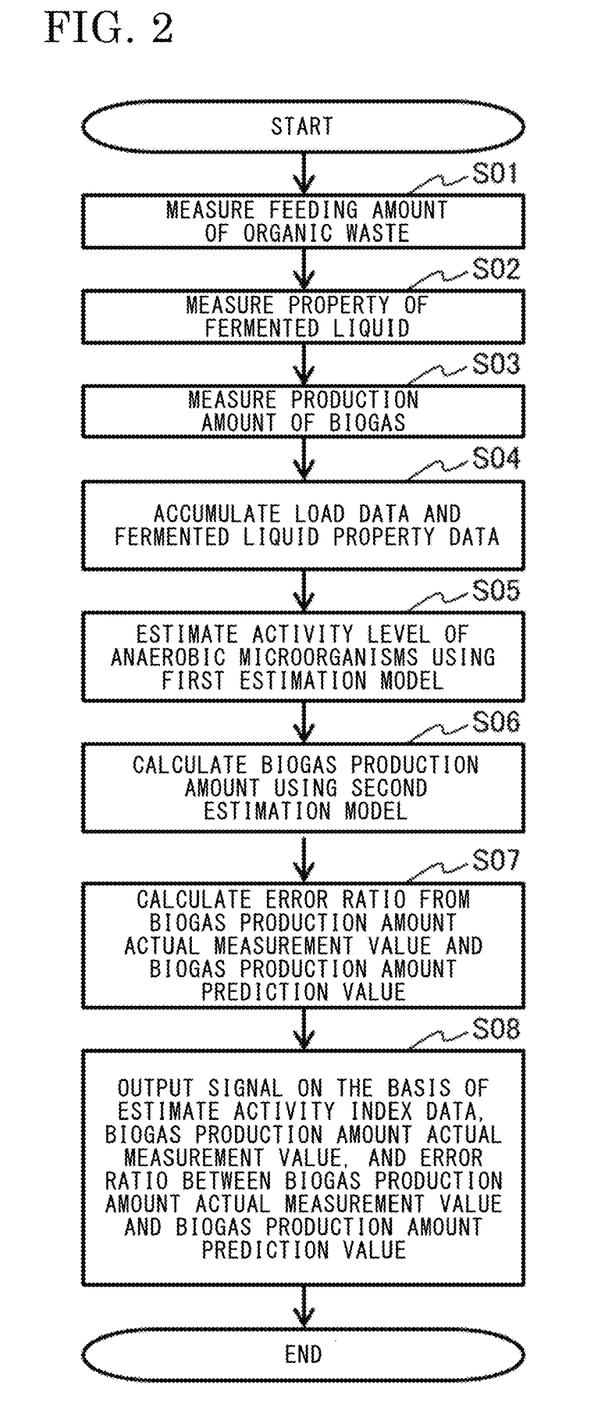
FIG. 2 is a flowchart showing the details of a process in the anaerobic digestion process monitoring system according to embodiment 1.

FIG. 2 is a flowchart showing the details of the process in the anaerobic digestion process monitoring system according to embodiment 1. In FIG. 2, step S01 is a load measurement step, step S02 is a fermented liquid measurement step, step S03 is a gas amount measurement step, step S04 is a process observation step, step S05 is a preprocessing step, step S06 is a gas production amount prediction step, step S07 is a process monitoring step, and step S08 is a failure determination step.

First, organic waste such as sludge, food residue, and industrial waste water is crushed by a disposer or the like as necessary, and then is sent to the buffer tank 1. In step S01 in FIG. 2, the organic waste inside the buffer tank 1 is fed into the digestion tank 2 by the feeding means 3, and the first sensor 4 measures the feeding amount of the organic waste into the digestion tank 2 and outputs load data which is a measurement result to the process observation unit 11. Then, the process proceeds to step S02. In step S02, the second sensor 5 measures the property of a fermented liquid which is a suspension of the organic waste and the anaerobic microorganisms inside the digestion tank 2, and outputs fermented liquid property data which is a measurement result to the process observation unit 11. Then, the process proceeds to step S03. In step S03, the third sensor 7 measures the production amount of biogas produced by the anaerobic microorganisms acclimated inside the digestion tank 2, and outputs a biogas production amount actual measurement value which is a measurement result to the process monitoring unit 14. Then, the process proceeds to step S04. In FIG. 2, the case where the process is performed in the order of step S01, step S02, then step S03, has been shown. However, it is preferable that, in step S01, step S02, and step S03, the respective values are measured at the same measurement time at predetermined measurement time intervals.

In step S04, the process observation unit 11 accumulates the load data acquired from the first sensor 4, as time-series data, and accumulates the fermented liquid property data acquired from the second sensor 5, as time-series data. In addition, the load data and the fermented liquid property data are outputted to the preprocessing unit 12 and the gas production amount prediction unit 13. Then, the process proceeds to step S05. In step S05, the preprocessing unit 12 acquires the load data and the fermented liquid property data from the process observation unit 11, calculates the estimate activity index data indicating the activity level of the anaerobic microorganisms from the load data and the fermented liquid property data acquired using the first estimation model, and accumulates the estimate activity index data, and the preprocessing unit 12 outputs the estimate activity index data to the gas production amount prediction unit 13. Then, the process proceeds to step S06. In step S06, the gas production amount prediction unit 13 acquires the load data and the fermented liquid property data from the process observation unit 11, acquires the estimate activity index data from the preprocessing unit 12, and calculates the biogas production amount prediction value from the load data, the fermented liquid property data, and the estimate activity index data, using the second estimation model. The gas production amount prediction unit 13 outputs the biogas production amount prediction value to the process monitoring unit 14 and the outside of the monitoring device 10, and outputs the estimate activity index data to the process monitoring unit 14. Then, the process proceeds to step S07. In step S07, the process monitoring unit 14 acquires a biogas production amount actual measurement value from the third sensor 7, acquires a biogas production amount prediction value from the gas production amount prediction unit 13, and calculates an error ratio from the biogas production amount actual measurement value and the biogas production amount prediction value. The process monitoring unit 14 outputs the error ratio to the outside of the monitoring device 10. Then, the process proceeds to step S08.

In step S08, the process monitoring unit 14 acquires the estimate activity index data from the gas production amount prediction unit 13. Further, in a case where the value of the error ratio between the biogas production amount actual measurement value and the biogas production amount prediction value is outside a predetermined error ratio normal range and the biogas production amount actual measurement value is within a predetermined gas production amount normal range, the process monitoring unit 14 outputs a signal for recommending maintenance of the first sensor 4 and the second sensor 5. Further, in a case where the value of the error ratio between the biogas production amount actual measurement value and the biogas production amount prediction value is outside the predetermined error ratio normal range, the biogas production amount actual measurement value is outside the predetermined gas production amount normal range, and the estimate activity index data is within the predetermined activity index normal range, the process monitoring unit 14 outputs a signal for recommending maintenance of the third sensor 7. Further, in a case where the value of the error ratio between the biogas production amount actual measurement value and the biogas production amount prediction value is within the predetermined error ratio normal range and the estimate activity index data is outside the predetermined activity index normal range, the process monitoring unit 14 outputs a signal for recommending stop of the biogas production system and recommending confirmation of the property of the organic waste inside the buffer tank 1 to be fed into the digestion tank 2, and ends the process in the anaerobic digestion process monitoring system.

As described above, the anaerobic digestion process monitoring system according to embodiment 1 is an anaerobic digestion process monitoring system which predicts a production amount of biogas to be produced from a fermented liquid obtained by acclimating anaerobic microorganisms inside a digestion tank 2 with organic waste fed into the digestion tank 2, and monitors a state of an anaerobic digestion process, the anaerobic digestion process monitoring system including: a first sensor 4 which measures a feeding amount of the organic waste into the digestion tank 2 and outputs a measurement result as load data; a second sensor 5 which measures a property of the fermented liquid inside the digestion tank 2 and outputs a measurement result as fermented liquid property data; a preprocessing unit 12 which calculates estimate activity index data indicating an activity level of the anaerobic microorganisms from the load data and the fermented liquid property data, using a first estimation model; and a gas production amount prediction unit 13 which calculates a biogas production amount prediction value from the load data, the fermented liquid property data, and the estimate activity index data, using a second estimation model. Thus, it is possible to predict the biogas production amount with high accuracy even when the activity of the anaerobic microorganisms inside the digestion tank 2 changes.

It has been found that there is a synergistic effect that the biogas production speed or the decomposition speed improves (changes) depending on a combination of organic wastes to be fed. In recent years, the kinds of organic wastes to be fed have been increasing. Therefore, if the activity of the anaerobic microorganisms in the digestion tank cannot be grasped, it becomes more difficult to predict the biogas production amount. A method for performing prediction calculation for the biogas production amount by measuring the number of individual anaerobic microorganisms in the digestion tank in addition to using information about the feeding amount or the mixture ratio of organic wastes, is proposed. In this method, prediction accuracy for the biogas production amount is improved, but a large amount of labor is needed for measuring the number of individual anaerobic microorganisms inside the digestion tank 2, resulting in increase in the load of operation management. The anaerobic digestion process monitoring system according to embodiment 1 makes it possible to achieve both of suppression of increase in the operation management load and high-accuracy prediction for biogas.

Embodiment 2

Figure 3:
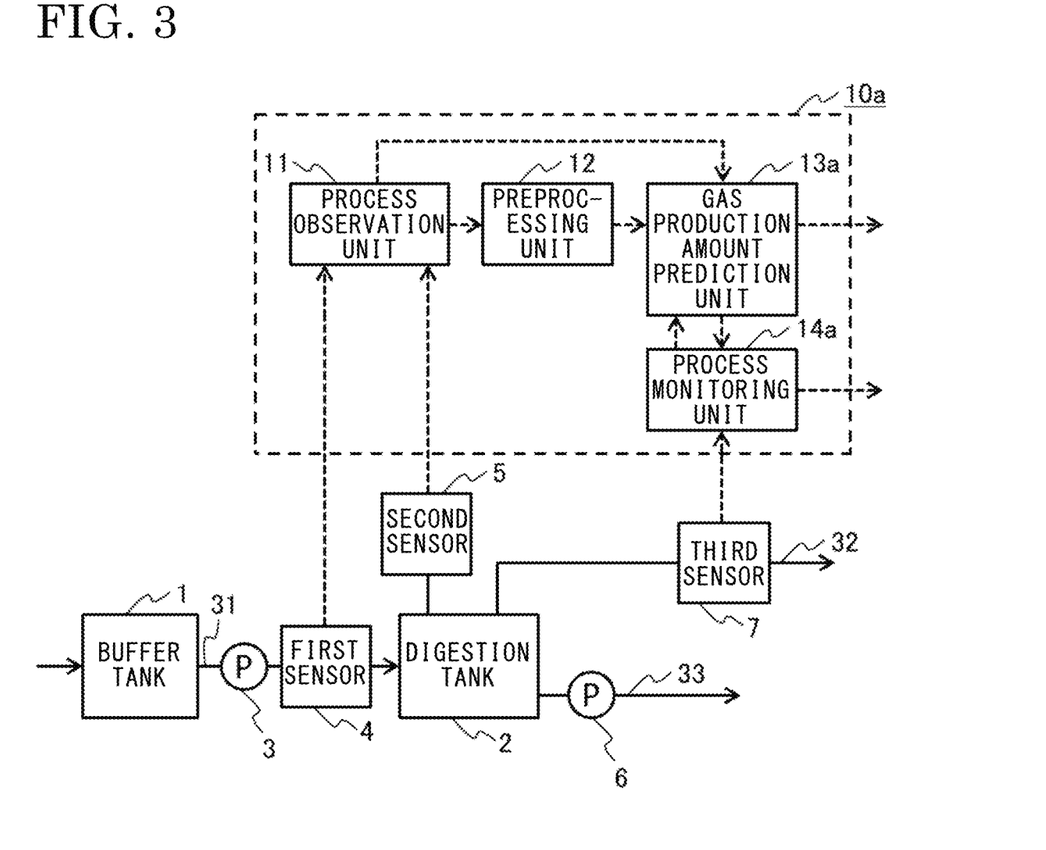
FIG. 3 shows a configuration of an anaerobic digestion process monitoring system according to embodiment 2.

FIG. 3 shows a configuration of an anaerobic digestion process monitoring system according to embodiment 2. In the anaerobic digestion process monitoring system according to embodiment 2 shown in FIG. 3, as compared to the anaerobic digestion process monitoring system according to embodiment 1 shown in FIG. 1, the monitoring device 10 is replaced with a monitoring device 10*a*, the gas production amount prediction unit 13 is replaced with a gas production amount prediction unit 13*a*, and the process monitoring unit 14 is replaced with a process monitoring unit 14*a*. The gas production amount prediction unit 13*a* has the same function as the gas production amount prediction unit 13, and further has a function described below. Similarly, the process monitoring unit 14*a* has the same function as the process monitoring unit 14, and further has a function described below. The other components of the anaerobic digestion process monitoring system according to embodiment 2 are the same as those of the anaerobic digestion process monitoring system according to embodiment 1.

The process monitoring unit 14*a* acquires load data, fermented liquid property data, estimate activity index data, and a biogas production amount prediction value from the gas production amount prediction unit 13*a*, and acquires a biogas production amount actual measurement value from the third sensor 7. In a case where the value of the error ratio between the biogas production amount actual measurement value and the biogas production amount prediction value is within a predetermined error ratio normal range, the biogas production amount actual measurement value is within a predetermined gas production amount normal range, and the estimate activity index data is within a predetermined activity index normal range, the process monitoring unit 14*a* calculates update correlation data which is correlation data between the biogas production amount actual measurement value, and the load data, the fermented liquid property data, and the estimate activity index data, and outputs the calculated update correlation data to the gas production amount prediction unit 13*a*. The gas production amount prediction unit 13*a* updates the calculation formula for the second estimation model, using the update correlation data acquired from the process monitoring unit 14*a*. That is, update correlation data which is correlation data between the biogas production amount actual measurement value, and the load data, the fermented liquid property data, and the estimate activity index data obtained in actual operation, which are acquired from the process monitoring unit 14*a*, is sequentially added to correlation data between the biogas production amount, and the load amount which is the feeding amount of organic waste, the fermented liquid property data which is information about the property of the fermented liquid in the digestion tank, and the estimate activity index data, acquired in the learning period provided initially after system introduction or the test in which organic waste is fed into the laboratory-test digestion tank, whereby the second estimation model can be updated. The update is performed by, for example, correcting a coefficient for each of a plurality of explanatory variables (load data, fermented liquid property data, and estimate activity index data) extracted in the regression formula of the second estimation model. While the second estimation model is updated as described above, the correlation between the biogas production amount, and the load amount which is the feeding amount of organic waste, the fermented liquid property data which is information about the property of the fermented liquid in the digestion tank, and the estimate activity index data, obtained in the test in which organic waste is fed into the laboratory-test digestion tank, may change in actual operation, due to the synergistic effect that the biogas production speed or the decomposition speed improves (changes) depending on a combination of organic wastes to be fed. Even in this case, by updating the second estimation model using the update correlation data acquired in actual operation, it becomes possible to predict the biogas production amount in accordance with change in the correlation without increasing the operation management load.

The second estimation model is updated using only the update correlation data obtained in a case where it is confirmed that the value of the error ratio between the biogas production amount actual measurement value and the biogas production amount prediction value is within the predetermined error ratio normal range, the biogas production amount actual measurement value is within the predetermined gas production amount normal range, and the estimate activity index data is within the predetermined activity index normal range. Therefore, the second estimation model can be updated using data obtained when all of the first sensor 4, the second sensor 5, and the third sensor 7 are outputting normal values, and the second estimation model is not updated when any of the first sensor 4, the second sensor 5, and the third sensor 7 is outputting an abnormal value due to failure.

It has been described that the process monitoring unit 14a acquires the load data, the fermented liquid property data, and the estimate activity index data from the gas production amount prediction unit 13a. However, the process monitoring unit 14a may acquire the load data and the fermented liquid property data from the process observation unit 11 and acquire the estimate activity index data from the preprocessing unit 12.

As described above, in the anaerobic digestion process monitoring system according to embodiment 2, in a case where the value of the error ratio is within the predetermined error ratio normal range, the biogas production amount actual measurement value is within the predetermined gas production amount normal range, and the estimate activity index data is within the predetermined activity index normal range, the process monitoring unit 14a calculates update correlation data which is correlation data between the biogas production amount actual measurement value, and the load data, the fermented liquid property data, and the estimate activity index data, and outputs the update correlation data to the gas production amount prediction unit 13a. The gas production amount prediction unit 13a updates the calculation formula of the second estimation model, using the update correlation data. Thus, even in a case where the correlation between the biogas production amount, and the load amount, the fermented liquid property data, and the estimate activity index data, obtained in the test in which organic waste is fed into the laboratory-test digestion tank, changes in actual operation, the second estimation model is updated using the update correlation data acquired in actual operation, whereby it becomes possible to predict the biogas production amount in accordance with change in the correlation, without increasing the operation management load.

Embodiment 3

Figure 4:
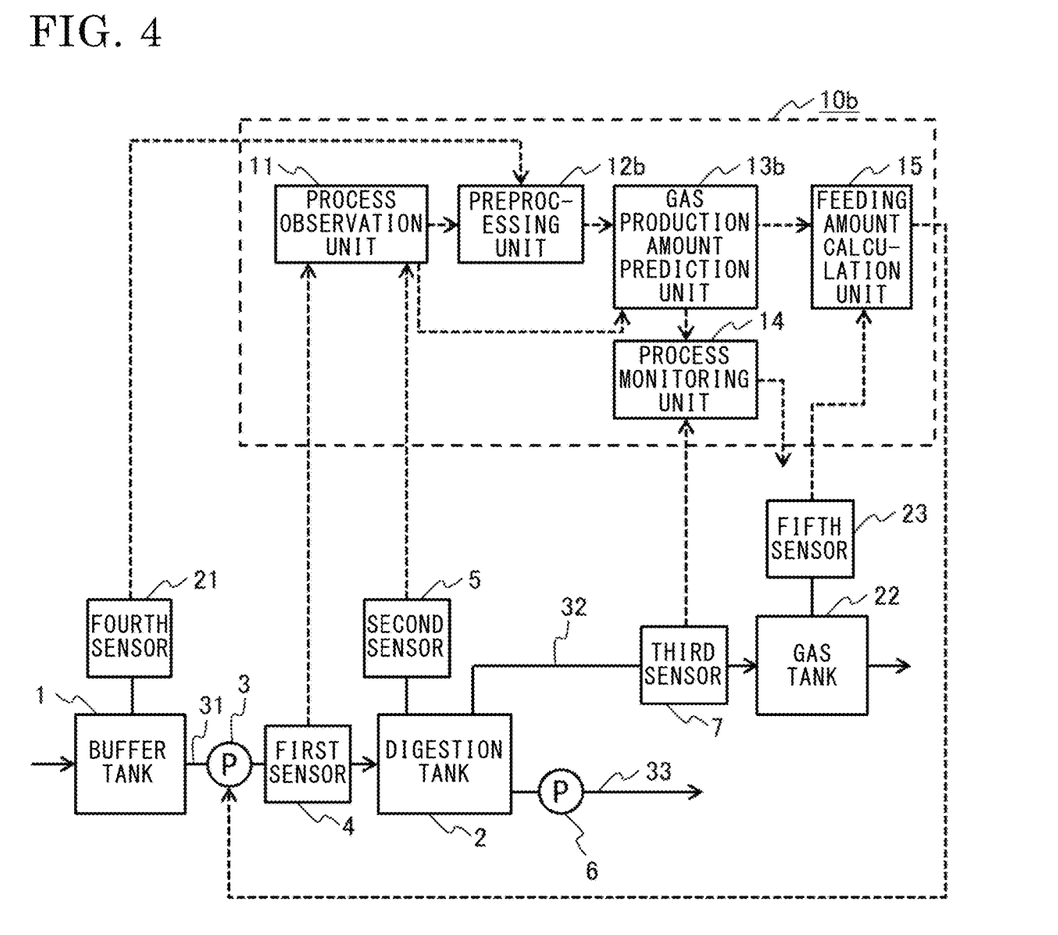
FIG. 4 shows a configuration of an anaerobic digestion process monitoring system according to embodiment 3.

FIG. 4 shows a configuration of an anaerobic digestion process monitoring system according to embodiment 3. In the anaerobic digestion process monitoring system according to embodiment 3 shown in FIG. 4, as compared to the anaerobic digestion process monitoring system according to embodiment 1 shown in FIG. 1, a feeding amount calculation unit 15, a fourth sensor 21, a gas tank 22, and a fifth sensor 23 are added, the preprocessing unit 12 is replaced with a preprocessing unit 12b, the gas production amount prediction unit 13 is replaced with a gas production amount prediction unit 13b, and a monitoring device 10b includes the process observation unit 11, the preprocessing unit 12b, the gas production amount prediction unit 13b, the process monitoring unit 14, and the feeding amount calculation unit 15. The preprocessing unit 12b has the same function as the preprocessing unit 12, and further has a function described below. Similarly, the gas production amount prediction unit 13b has the same function as the gas production amount prediction unit 13, and further has a function described below. The other components of the anaerobic digestion process monitoring system according to embodiment 3 are the same as those of the anaerobic digestion process monitoring system according to embodiment 1.

The fourth sensor 21 measures the storage amount of organic waste inside the buffer tank 1, and outputs a measurement result as a waste storage amount to the preprocessing unit 12b. The gas tank 22 stores biogas produced in the digestion tank 2. The fifth sensor 23 measures the storage amount of biogas inside the gas tank 22, and outputs a measurement result as a gas storage amount to the feeding amount calculation unit 15. Transfer of information from the fifth sensor 23 to the feeding amount calculation unit 15 may be performed through communication via a wire or wirelessly, or may be performed via a network such as the Internet.

Next, operation of the monitoring device 10b will be described. The preprocessing unit 12b acquires the load data and the fermented liquid property data from the process observation unit 11, and acquires the waste storage amount from the fourth sensor 21. Next, the preprocessing unit 12b calculates the estimate activity index data indicating the activity level of the anaerobic microorganisms from the load data and the fermented liquid property data, using the first estimation model, accumulates the calculated estimate activity index data, and outputs the estimate activity index data to the gas production amount prediction unit 13b. Further, the preprocessing unit 12b calculates an allowable feeding amount which is such a maximum value of the feeding amount of organic waste into the digestion tank 2 that the estimate activity index data becomes a value within a predetermined activity index reference range, from the waste storage amount and the fermented liquid property data, using the first estimation model, and outputs information about the allowable feeding amount to the gas production amount prediction unit 13b. The activity index reference range may be the same as the activity index normal range shown in embodiment 1 and embodiment 2.

The gas production amount prediction unit 13b acquires the load data and the fermented liquid property data from the process observation unit 11, acquires the estimate activity index data from the preprocessing unit 12b, calculates the biogas production amount prediction value from the load data, the fermented liquid property data, and the estimate activity index data, using the second estimation model, and outputs the biogas production amount prediction value. Further, the gas production amount prediction unit 13b calculates a gas production amount change prediction value which is a prediction value for the production amount of biogas with respect to each feeding amount of organic waste into the digestion tank 2 when the feeding amount is changed from zero to the allowable feeding amount, from the fermented liquid property data and the estimate activity index data, using the second estimation model, and generates gas production amount characteristic information indicating the relationship between the gas production amount change prediction value and the feeding amount of organic waste when the feeding amount is changed from zero to the allowable feeding amount. The gas production amount prediction unit 13b outputs the gas production amount characteristic information to the feeding amount calculation unit 15.

The feeding amount calculation unit 15 acquires the gas production amount characteristic information from the gas production amount prediction unit 13b, acquires the gas storage amount from the fifth sensor 23, and acquires a biogas requirement amount which is a requirement command for the biogas production amount from the outside. The feeding amount calculation unit 15 calculates a feeding amount designation value which is a feeding amount of organic waste into the digestion tank 2, required for sending out biogas in the biogas requirement amount from the gas tank 22, using the gas production amount characteristic information and the gas storage amount, and transmits a feeding amount control signal for feeding organic waste in the feeding amount designated by the feeding amount designation value into the digestion tank 2, to the feeding means 3. The feeding means 3 acquires the feeding amount control signal from the feeding amount calculation unit 15, and feeds organic waste in the feeding amount designated by the feeding amount designation value, into the digestion tank 2.

The feeding means 3 is, for example, a pump, and is means that can send organic waste from the buffer tank 1 to the digestion tank 2 and can change the sending amount by the feeding amount control signal from the feeding amount calculation unit 15. The fourth sensor 21 measures the storage amount of organic waste inside the buffer tank 1, and is, for example, a water level sensor for measuring the water level in the buffer tank 1, or is, for example, a weight sensor for measuring the weight of the buffer tank 1 including the organic waste. The fifth sensor 23 measures the storage amount of biogas inside the gas tank 22, and is, for example, a gas pressure gauge for measuring the pressure inside the gas tank 22.

As described above, the anaerobic digestion process monitoring system according to embodiment 3 includes: a buffer tank 1 which stores the organic waste to be fed into the digestion tank 2; a fourth sensor 21 which measures a storage amount of the organic waste inside the buffer tank 1 and outputs a measurement result as a waste storage amount; a gas tank 22 which stores the biogas produced in the digestion tank 2; a fifth sensor 23 which measures a storage amount of the biogas inside the gas tank 22 and outputs a measurement result as a gas storage amount; a feeding amount calculation unit 15 which outputs a feeding amount control signal for feeding the organic waste in a feeding amount designated by a feeding amount designation value, into the digestion tank 2; and feeding means 3 which acquires the feeding amount control signal and feeds the organic waste in the feeding amount designated by the feeding amount designation value, into the digestion tank 2. The preprocessing unit 12b calculates an allowable feeding amount which is such a maximum value of the feeding amount of the organic waste into the digestion tank 2 that the estimate activity index data becomes a value within a predetermined activity index reference range, from the waste storage amount and the fermented liquid property data, using the first estimation model, and outputs the allowable feeding amount. The gas production amount prediction unit 13b calculates a gas production amount change prediction value which is a prediction value of the production amount of the biogas with respect to each feeding amount of the organic waste into the digestion tank 2 when the feeding amount is changed from zero to the allowable feeding amount, from the fermented liquid property data and the estimate activity index data, using the second estimation model, and generates and outputs gas production amount characteristic information which indicates a relationship between the gas production amount change prediction value and the feeding amount of the organic waste when the feeding amount is changed from zero to the allowable feeding amount. The feeding amount calculation unit 15 acquires a biogas requirement amount which is a requirement command for the production amount of the biogas, calculates the feeding amount designation value which is the feeding amount of the organic waste into the digestion tank 2 for sending out the biogas in the biogas requirement amount from the gas tank 22, using the gas production amount characteristic information and the gas storage amount, and generates the feeding amount control signal for feeding the organic waste in the feeding amount designated by the feeding amount designation value. Thus, in a case where biogas obtained through the anaerobic digestion process is used for electric generation in an electric generator (not shown) provided at a stage subsequent to the gas tank 22 and is utilized as a distributed power supply, it becomes possible to suppress increase in the management load for the biogas electric generation amount required for the electric generator, i.e., suppress increase in the management load for the biogas production amount required for operation of the anaerobic digestion process.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Figure 5:
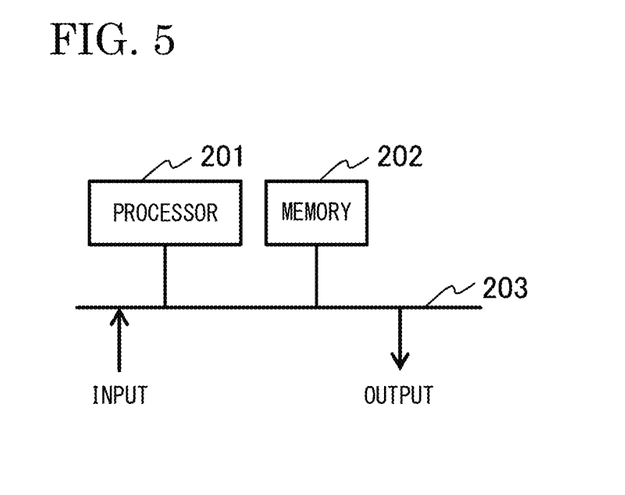
FIG. 5 shows a schematic diagram showing an example of the hardware configuration of the monitoring device according to each embodiment.

FIG. 5 is a schematic diagram showing an example of the hardware configuration of the monitoring device 10, 10a, 10b according to each embodiment. The process observation unit 11, the preprocessing unit 12, 12b, the gas production amount prediction unit 13, 13a, 13b, the process monitoring unit 14, 14a, and the feeding amount calculation unit 15 are implemented by a processor 201 such as a central processing unit (CPU) which executes a program stored in a memory 202. The memory 202 can also be used as a temporary storage device in each processing executed by the processor 201. The memory 202 is a nonvolatile or volatile semiconductor memory such as a RAM, a ROM, a flash memory, or an EPROM, a magnetic disk, an optical disc, or a combination thereof. The processor 201 and the memory 202 are connected to a bus 203.

Figure 6:
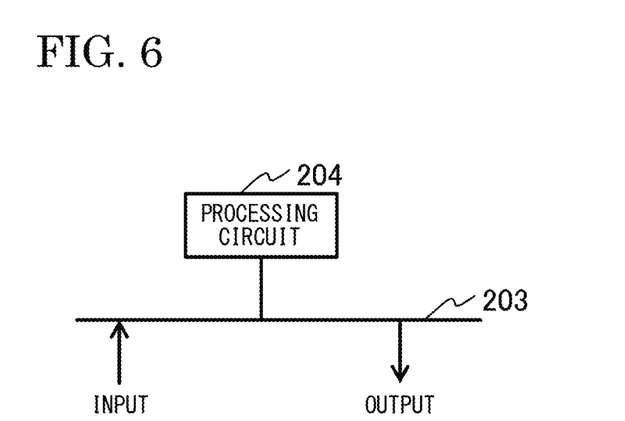
FIG. 6 shows a schematic diagram showing another example of the hardware configuration of the monitoring device according to each embodiment.

FIG. 6 is a schematic diagram showing another example of the hardware configuration of the monitoring device 10, 10a, 10b according to each embodiment. In FIG. 6, a processing circuit 204 is connected to the bus 203. In a case where the processing circuit 204 is dedicated hardware, the processing circuit 207 is, for example, a single circuit, a complex circuit, a programed processor, an application specific integrated circuit (ASIC), a field programmable gate array (FPGA), or a combination thereof. Each function of the monitoring device 10, 10a, 10b may be implemented by the processing circuit 204, or the functions may be collectively implemented by the processing circuit 204. Some of the functions of the monitoring device 10, 10a, 10b may be implemented by dedicated hardware and others may be implemented by software or firmware.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 buffer tank
2 digestion tank
3 feeding means
4 first sensor
5 second sensor
6 discharge means
7 third sensor
10, 10a, 10b monitoring device
11 process observation unit
12, 12b preprocessing unit
13, 13a, 13b gas production amount prediction unit
14, 14a process monitoring unit
15 feeding amount calculation unit
21 fourth sensor
22 gas tank
23 fifth sensor
31 feeding pipe
32 gas pipe
33 discharge pipe
201 processor
202 memory
203 bus
204 processing circuit

The invention claimed is:

1. An anaerobic digestion process monitoring system which predicts a production amount of biogas to be produced from a fermented liquid obtained by acclimating anaerobic microorganisms inside a digestion tank with organic waste fed into the digestion tank, and monitors a state of an anaerobic digestion process, the anaerobic digestion process monitoring system comprising:
   a first sensor which measures a feeding amount of the organic waste into the digestion tank and outputs a measurement result as load data;
   a second sensor which measures at least pH and an electrical conductivity of the fermented liquid inside the digestion tank, as a property, and outputs a measurement result;
   a process observation circuitry to accumulate the load data and at least the pH and the electrical conductivity;
   a preprocessing circuitry to calculate a concentration of an organic acid and a concentration of ammonia nitrogen from the load data, the pH, and the electrical conductivity, using a first estimation model constituted of at least a correlation formula between the concentration of the organic acid in the fermented liquid inside the digestion tank, and the load data and the pH, and a correlation formula between the concentration of the ammonia nitrogen in the fermented liquid inside the digestion tank, and the load data and the electrical conductivity, acquired before system introduction or in a given learning period after system introduction; and
   a gas production amount prediction circuitry to predict a biogas production amount prediction value, from at least the load data, the pH, the electrical conductivity, and the concentration of the organic acid and the concentration of the ammonia nitrogen calculated by the preprocessing circuitry, using a second estimation model constituted of at least a correlation formula between the biogas production amount, and the load data, the pH, and the concentration of the organic acid in the fermented liquid inside the digestion tank, and a correlation formula between the biogas production amount, and the load data, the electrical conductivity, and the concentration of the ammonia nitrogen in the fermented liquid inside the digestion tank, acquired before system introduction or in a given learning period after system introduction, wherein
   the state of the anaerobic digestion process is monitored using the concentration of the organic acid and the concentration of the ammonia nitrogen calculated by the preprocessing circuitry, and the biogas production amount prediction value predicted by the gas production amount prediction circuitry.

2. The anaerobic digestion process monitoring system according to claim 1, further comprising:
   a third sensor which measures the production amount of the biogas produced in the digestion tank, and outputs a measurement result as a biogas production amount actual measurement value; and
   a process monitoring circuitry to calculate an error ratio from the biogas production amount actual measurement value and the biogas production amount prediction value.

3. The anaerobic digestion process monitoring system according to claim 2, wherein
   the first sensor measures the feeding amount of the organic waste at predetermined measurement time intervals and outputs the feeding amount as the load data, the second sensor measures the property of the fermented liquid at the measurement time intervals at times when the first sensor measures the feeding amount of the organic waste, and outputs a measurement result, the third sensor measures the production amount of the biogas produced in the digestion tank, at the measurement time intervals at the times when the first sensor measures the feeding amount of the organic waste, and outputs the production amount as the biogas production amount actual measurement value, the process observation circuitry accumulates the load data, the pH, and the electrical conductivity as time-series data at the measurement time intervals, and where one of the times when the first sensor measures the feeding amount of the organic waste is defined as a specific time, the preprocessing circuitry calculates the concentration of the organic acid and the concentration of the ammonia nitrogen at the specific time, from the load data measured at the specific time and the pH and the electrical conductivity measured at the specific time, and accumulates the concentration of the organic acid and the concentration of the ammonia nitrogen at each time as time-series data at the measurement time intervals, and the gas production amount prediction circuitry calculates the biogas production amount prediction value at the specific time, from the load data measured at the specific time, the pH and the electrical conductivity measured at the specific time, and the concentration of the organic acid and the concentration of the ammonia nitrogen at the specific time.

4. The anaerobic digestion process monitoring system according to claim 3, wherein
in a case where a value of the error ratio is within a predetermined error ratio normal range, the biogas production amount actual measurement value is within a predetermined gas production amount normal range, and the concentration of the organic acid and the concentration of the ammonia nitrogen are within a predetermined activity index normal range, the process monitoring circuitry calculates update correlation data which is correlation data between the biogas production amount actual measurement value, and the load data, the pH, the electrical conductivity, the concentration of the organic acid, and the concentration of the ammonia nitrogen, and outputs the update correlation data to the gas production amount prediction circuitry, and
the gas production amount prediction circuitry updates a calculation formula for the second estimation model, using the update correlation data.

5. The anaerobic digestion process monitoring system according to claim 4, wherein
the gas production amount prediction circuitry outputs the concentration of the organic acid and the concentration of the ammonia nitrogen to the process monitoring circuitry, and
in a case where a value of the error ratio is outside the predetermined error ratio normal range, the biogas production amount actual measurement value is outside the predetermined gas production amount normal range, and the concentration of the organic acid and the concentration of the ammonia nitrogen are within the predetermined activity index normal range, the process monitoring circuitry outputs a signal for recommending maintenance of the third sensor.

6. The anaerobic digestion process monitoring system according to claim 4, wherein
in a case where a value of the error ratio is outside the predetermined error ratio normal range and the biogas production amount actual measurement value is within the predetermined gas production amount normal range, the process monitoring circuitry outputs a signal for recommending maintenance of the first sensor and the second sensor.

7. The anaerobic digestion process monitoring system according to claim 4, wherein
the gas production amount prediction circuitry outputs the concentration of the organic acid and the concentration of the ammonia nitrogen to the process monitoring circuitry, and
in a case where a value of the error ratio is within the predetermined error ratio normal range, the biogas production amount actual measurement value is outside the predetermined gas production amount normal range, and the concentration of the organic acid and the concentration of the ammonia nitrogen are outside the predetermined activity index normal range, the process monitoring circuitry outputs a signal for recommending stop of a biogas production system and recommending confirmation of a property of the organic waste to be fed into the digestion tank.

8. The anaerobic digestion process monitoring system according to claim 1, further comprising:
a buffer tank which stores the organic waste to be fed into the digestion tank;
a fourth sensor which measures a storage amount of the organic waste inside the buffer tank and outputs a measurement result as a waste storage amount;
a gas tank which stores the biogas produced in the digestion tank;
a fifth sensor which measures a storage amount of the biogas inside the gas tank and outputs a measurement result as a gas storage amount;
a feeding amount calculation circuitry to output a feeding amount control signal for feeding the organic waste in a feeding amount designated by a feeding amount designation value, into the digestion tank; and
a pump to acquire the feeding amount control signal and to feed the organic waste in the feeding amount designated by the feeding amount designation value, into the digestion tank, wherein
the preprocessing circuitry calculates an allowable feeding amount which is such a maximum value of the feeding amount of the organic waste into the digestion tank that the concentration of the organic acid and the concentration of the ammonia nitrogen become values within a predetermined activity index reference range, from the waste storage amount, the pH, and the electrical conductivity, using the first estimation model, and outputs the allowable feeding amount,
the gas production amount prediction circuitry calculates a gas production amount change prediction value which is a prediction value of the production amount of the biogas with respect to each feeding amount of the organic waste into the digestion tank when the feeding amount is changed from zero to the allowable feeding amount, from the pH, the electrical conductivity, the concentration of the organic acid, and the concentration of the ammonia nitrogen, using the second estimation model, and generates and outputs gas production amount characteristic information which indicates a relationship between the gas production amount change prediction value and the feeding amount of the organic waste when the feeding amount is changed from zero to the allowable feeding amount, and the feeding amount calculation circuitry acquires a biogas requirement amount which is a requirement command for the production amount of the biogas, calculates the feeding amount designation value which is the feeding amount of the organic waste into the digestion tank for sending out the biogas in the biogas requirement amount from the gas tank, using the gas production amount characteristic information and the gas storage amount, and generates the feeding amount control signal for feeding the organic waste in the feeding amount designated by the feeding amount designation value.

9. An anaerobic digestion process monitoring method in which a production amount of biogas to be produced from a fermented liquid obtained by acclimating anaerobic microorganisms inside a digestion tank with organic waste fed into the digestion tank is predicted and a state of an anaerobic digestion process is monitored, the anaerobic digestion process monitoring method comprising:

measuring a feeding amount of the organic waste into the digestion tank and outputting a measurement result as load data;

measuring at least pH and an electrical conductivity of the fermented liquid inside the digestion tank, as a property;

accumulating the load data and at least the pH and the electrical conductivity;

calculating a concentration of an organic acid and a concentration of ammonia nitrogen from the load data, the pH, and the electrical conductivity, using a first estimation model constituted of at least a correlation formula between the concentration of the organic acid in the fermented liquid inside the digestion tank, and the load data and the pH, and a correlation formula between the concentration of the ammonia nitrogen in the fermented liquid inside the digestion tank, and the load data and the electrical conductivity, acquired before system introduction or in a given learning period after system introduction; and predicting a biogas production amount prediction value, from at least the load data, the pH, the electrical conductivity, and the concentration of the organic acid and the concentration of the ammonia nitrogen calculated in the calculating, using a second estimation model constituted of at least a correlation formula between the biogas production amount, and the load data, the pH, and the concentration of the organic acid in the fermented liquid inside the digestion tank, and a correlation formula between the biogas production amount, and the load data, the electrical conductivity, and the concentration of the ammonia nitrogen in the fermented liquid inside the digestion tank, acquired before system introduction or in a given learning period after system introduction, wherein the state of the anaerobic digestion process is monitored using the concentration of the organic acid and the concentration of the ammonia nitrogen calculated in the calculating, and the biogas production amount prediction value predicted in the predicting.

10. The anaerobic digestion process monitoring method according to claim 9, further comprising:

measuring the production amount of the biogas produced in the digestion tank, and outputting a measurement result as a biogas production amount actual measurement value; and calculating an error ratio from the biogas production amount actual measurement value and the biogas production amount prediction value.

* * * * *